Dec. 25, 1923.
A. WINDMAISER
TWO-PIECE RIM
Filed July 26, 1921
1,478,934
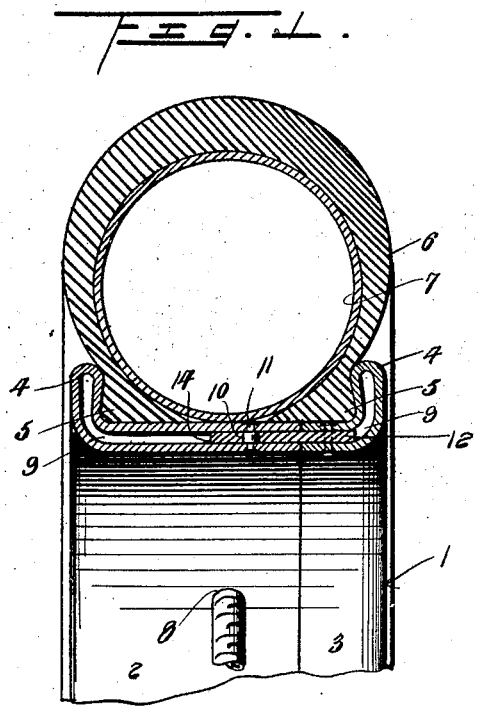
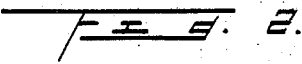
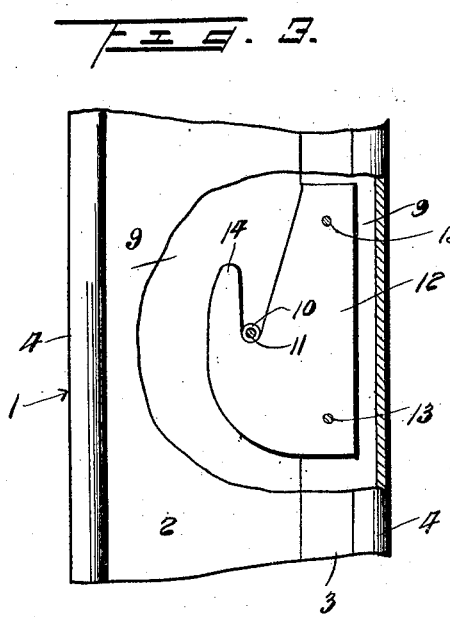
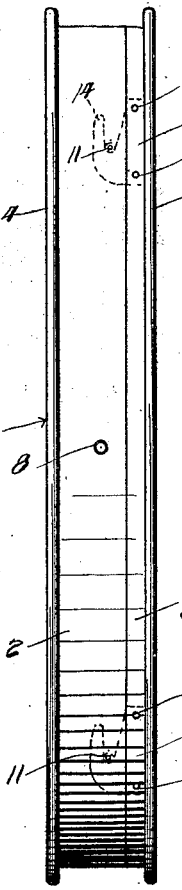
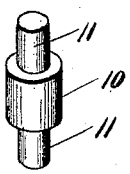
Inventor
A. Windmaiser
By
Attorney Patented Dec. 25, 1923.

1,478,934

UNITED STATES PATENT OFFICE.

ADOLPH WINDMAISER, OF SPOKANE, WASHINGTON.

TWO-PIECE RIM.

Application filed July 26, 1921. Serial No. 487,661.

*To all whom it may concern:*

Be it known that I, ADOLPH WINDMAISER, a citizen of the United States, residing at Spokane, in the county of Spokane and State of Washington, have invented certain new and useful Improvements in Two-Piece Rims; and I do hereby declare the following to be a full, clear, and exact description of the invention, such as will enable others skilled in the art to which it appertains to make and use the same.

This invention relates to new and useful improvements in pneumatic tire rims and has for its primary object the provision of a separable rim to facilitate the application and removal of a tire therefrom and also the provision of an improved means of fastening the sections of said rim together which will permit the easy separation of the sections without the use of special tools, and is adapted to firmly connect the sections during the time in which the rim is supporting an inflated tire so that the inflated tire may be carried on a rack.

Another object of this invention is the provision of a rim of the above stated character which will be simple, durable and efficient, and which may be manufactured and sold at a comparatiely low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a transverse sectional view illustrating a rim constructed in accordance with my invention and supporting a tire.

Figure 2 is an edge elevation illustrating the device,

Figure 3 is an enlarged detail sectional view illustrating one of the means of securing the sections of the rim together, Figure 4 is a detail view illustrating one of the fastening pins.

Referring in detail to the drawings, the numeral 1 indicates as an entirety a pneumatic tire rim, which includes a pair of annular sections 2 and 3 that have formed on their outer edges tire engaging flanges 4. The section 2 is of a greater width than the section 3 so that when the sections are assembled, their abutting edges will be disposed laterally of the space between the beads 5 of a tire 6 to prevent the usual inner tube 7 from being pinched by coming in contact with the abutting edges of the sections 2 and 3. The section 2 is provided with the usual opening 8 to receive the valve stem of the inner tube 7.

The sections 2 and 3 are each constructed from a single piece of metal that is bent upon itself to form the section and its respective flange 4 with a double wall construction and having a space 9 between said walls. A plurality of pins 10 are arranged within the space 9 of the section 2 adjacent the latter's inner edge and are provided with reduced ends 11 that are riveted in the walls of said section 2. The section 3 adjacent its inner edge and within its space 9 has plates 12 which are curved endwise so as to conform to the contour of the section 3 and are riveted to the walls of said section as illustrated at 13. The plates 12 have formed integrally therewith hooks 14 which are adapted to receive or engage the pins 10 for the purpose of locking the sections 2 and 3 against separation and which permits of the sections to be readily separated by moving one of said sections circumferentially with respect to the other and then laterally.

From the foregoing description taken in connection with the accompanying drawings, it will be noted that a tire may be easily and conveniently applied and removed from the rim 1 by laying the rim upon the ground with the section 3 disposed uppermost. With the rim supporting a tire and positioned upon the ground as described, the section 3 is turned circumferentially in respect to the section 2 so as to disengage the hooks 14 from the pins 10. The section 3 may then be lifted from engagement with the section 2 and also the tire. The tire may then be readily lifted from the section 2 without the use of special tools. It is also apparent that the tire may be readily applied to the section 2 and then the section 3 applied to the section 2 and also to the tire. After the application of the section 3 to the section 2 the former is turned circumferentially in respect to the latter so as to bring the hooks 14 in engagement with the pins 10. The tire may be then supported upon the rim in an inflated condition and carried upon a rack of an automobile if desired, When the rim is applied to a wheel in the usual manner, it is apparent that all strain is removed from the hooks 14 and pins 10 as the usual fastening means upon the wheel engaging the tire flanges 4 will relieve said hooks and pins 10 of the strain of securing the sections 2 and 3 together.

The rim may be constructed of aluminum or any other material suitable for the purpose while the hooks 14 and pins 10 are preferably constructed of steel, however, any other material may be employed.

While I have shown and described the preferred embodiment of my invention, it will be understood that minor changes in construction, combination, and arrangement of parts may be made without departing from the spirit and scope of the invention as claimed.

Having thus described my invention what I claim is:—

A tire rim comprising a pair of sections each comprising a single length of material bent upon itself to form the respective sections of double walls with a space therebetween, said material being bent to form tire engaging flanges, pins secured to the walls of one of said sections and located wholly within the space between the walls of said section, said pins having shoulders abutting the walls of said section and holding the same in spaced relationship, and plates secured within the space between the walls of the other sections and having hooks extending beyond the edge of the section and adapted to engage said pins to hold the sections together.

In testimony whereof I affix my signature in presence of two witnesses.

ADOLPH WINDMAISER.

Witnesses:
  W. W. ADAMS,
  J. G. SMITH.